United States Patent [19]

Pipper et al.

[11] Patent Number: 5,051,491
[45] Date of Patent: Sep. 24, 1991

[54] PROCESS FOR THE PREPARATION OF A LINEAR POLYAMIDE HAVING ETHER BRIDGES IN THE POLYMER CHAIN

[75] Inventors: Gunter Pipper, Bad Duerkheim; Eckhard M. Koch, Fussgoenheim, both of Fed. Rep. of Germany

[73] Assignee: BASF Aktiengesellschaft, Ludwigshafen, Fed. Rep. of Germany

[21] Appl. No.: 500,949

[22] Filed: Mar. 29, 1990

[30] Foreign Application Priority Data

Apr. 19, 1989 [DE] Fed. Rep. of Germany ....... 3912769

[51] Int. Cl.$^5$ .................................. C08G 69/28
[52] U.S. Cl. ...................... 528/335; 526/64; 526/65; 526/68; 528/310; 528/324; 528/336
[58] Field of Search ............... 528/335, 310, 324, 336; 526/68, 64, 65

[56] References Cited

U.S. PATENT DOCUMENTS 4,537,949 8/1985 Schmidt et al. ............... 528/335
4,540,772 9/1985 Pipper et al. .................. 528/335
4,713,437 12/1987 Pilz et al. ..................... 528/335

Primary Examiner—Harold D. Anderson
Attorney, Agent, or Firm—Keil & Weinkauf

[57] ABSTRACT

A process for the continuous preparation of a linear polyamide having ether bridges in the polymer chain, in which an aqueous solution of a salt of a diamine and an equimolar amount of a dicarboxylic acid, which may additionally contain a lactam or the corresponding aminocarboxylic acid, from 1 to 80% of the polyamide-forming units, based on the total polyamide-forming units, being diamine and/or dicarboxylic acid units which, after removal of the amine groups or carboxyl groups, have radicals of formula I

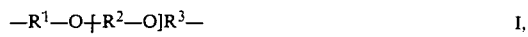
$$-R^1-O+R^2-O]R^3- \qquad I,$$

in which $R^1$, $R^2$ and $R^3$ are the same or different and denote alkylene radicals of from 2 to 6 carbon atoms, which may contain alkyl radicals of from 1 to 3 carbon atoms as substituents, and n is an integer from 1 to 60, is passed for a short period of time through a prepolymerization zone, the resulting mixture of prepolymer and vapor is intimately mixed and then separated, the vapor fraction obtained is separated to give an aqueous amine solution, which is recycled to the precondensation zone, the prepolymer is further condensed, discharged with the removal of water vapor, solidified and granulated and the polymer granules are further condensed, to the desired viscosity, in the solid phase under a blanket of an inert gas.

6 Claims, No Drawings

PROCESS FOR THE PREPARATION OF A LINEAR POLYAMIDE HAVING ETHER BRIDGES IN THE POLYMER CHAIN

DE-OS 2,454,120 discloses a process in which a salt of a dioxaalkane diamine and adipic acid is condensed with AH salt in a batchwise operation for 6 hours at a temperature of 250° C. and under autogenic pressure to give, after pressure release, a copolymer. A process of this kind is not very suitable for use on an industrial scale.

In another process, disclosed in U.S. Pat. No. 3,509,106, polyamides are obtained from a salt of adipic acid with ethylene-bis(3-aminopropyl) ether and nylon-6,6 salt by heating these compounds to a temperature below 250° C. under superatmospheric pressure in a first stage and then effecting condensation at a temperature which is from 10° to 60° C. higher, under reduced pressure, for a period of 3 hours or more. These prior art processes suffer from the drawback that the polyamides thus obtained are damaged during condensation and become discolored.

It is also known, from DE-OS 2,658,714, to prepare polyamides by condensing polytetrahydrofuran containing carboxyl end groups with hexamethylene diamine and caprolactam or other polyamide-forming compounds under superatmospheric pressure at a temperature of 230° C. and then continuing condensation in vacuo for a period of several hours. This process also suffers from the drawbacks stated above. Furthermore, polyamide units based on polytetrahydrofuran tend to cleave with the formation of tetrahydrofuran. Moreover, long reaction times are required to obtain high molecular weights. Finally, such polyamides tend to disintegrate.

It is therefore an object of the invention to provide a continuous process for the preparation of a polyamide having ether bridges in the polymer chain, in which damage to the polyamide and discoloration thereof are substantially avoided, high molecular weights are obtained and cleavage of the ether bridge is avoided.

This object is achieved by a process for the continuous preparation of a linear polyamide having ether bridges in the polymer chain, in which an aqueous solution of a salt of a diamine and an equimolar amount of a dicarboxylic acid, which may additionally contain a lactam or the corresponding aminocarboxylic acid, from 1 to 80% of the polyamide-forming units, based on the total polyamide-forming units, being diamine and-/or dicarboxylic acid units which, after removal of the amine groups or carboxyl groups, have radicals of formula I below $$-R^1-[O-R^2]_nO_nR^3-\qquad\text{I,}$$

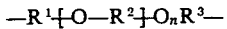

in which $R^1$, $R^2$ and $R^3$ are the same or different and denote alkylene radicals of from 2 to 6 carbon atoms, which may contain alkyl radicals of from 1 to 3 carbon atoms as substituents, and n is an integer from 1 to 60, is heated to a temperature suitable for the formation of polyamides, under superatmospheric pressure and with evaporation of water, the vapor phase being separated from the polymer melt, wherein a) an aqueous solution of the starting materials is passed through a tubular precondensation zone equipped with baffles over a period of from 1 to 10 minutes and is heated over the first third of said zone to a temperature of from 250° to 290° C. under a pressure of from 1 to 10 bar, with evaporation of water, to give a mixture substantially comprising a vapor phase and molten prepolymer, which vapor phase and prepolymer are brought into intimate contact with each other over the subsequent two-thirds of said precondensation zone, b) the molten prepolymer is separated from the vapor phase in a separation zone, c) the prepolymer is condensed in a condensation zone under a pressure of from 1 to 10 bar and at a temperature of from 250° to 290° C. during a residence time of from 5 to 30 minutes to form a polymer, d) the polymer is removed from the condensation zone through a discharge zone with removal of the residual water to give a polymer capable of being granulated, e) which polymer is further condensed in the solid phase to the desired viscosity, under a blanket of inert gas at elevated temperature, f) the vapor phase obtained in stage b) is separated, in a column, into steam and an aqueous solution containing diamine and the said aqueous diamine solution is recycled to stage a).

Our novel process has the advantages of being easy to carry out continuously and of allowing for recycling of the separated amines. Another advantage of our novel process is the prevention of damage to the polymer whilst in the molten state, which gives a polymer of improved whiteness. The novel process also has the advantage that disintegration of the copolymer is avoided.

According to the present invention the starting material is an aqueous solution of a salt of a diamine and an equimolar amount of a dicarboxylic acid, which may additionally contain a lactam or the corresponding aminocarboxylic acid, from 1 to 80% of the polyamide-forming units, based on the total polyamide-forming units, being diamine and/or dicarboxylic acid units which, after removal of the amine groups or carboxyl groups, have radicals of formula I $$-R^1-O[-R^2-O]_nR^3-\qquad\text{I,}$$

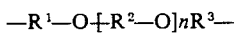

in which $R^1$, $R^2$, and $R^3$ are the same or different and denote alkylene radicals of from 2 to 6 carbon atoms, which may contain alkyl radicals of from 1 to 3 carbon atoms as substituents, and n is an integer from 1 to 60.

A preferred dicarboxylic acid has formula II below $$HOOC-R^4-COOH\qquad\text{II,}$$

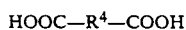

in which $R^4$ is alkyl of from 2 to 16 carbon atoms or is 1,3- or 1,4-phenylene or is a radical of formula I in which $R^1$, $R^2$ and $R^3$ and n have the meanings stated above. We particularly prefer a dicarboxylic acid of formula II in which $R^4$ stands for alkylene of from 4 to 8 carbon atoms, 1,3- or 1,4-phenylene or a radical of formula I in which $R^1$, $R^2$ and $R^3$ are the same or different and denote alkylene of from 2 to 4 carbon atoms and n is an integer from 1 to 20. Examples of suitable dicarboxylic acids are adipic acid, suberic acid, azelaic acid and dodecanedioic acid, adipic acid being particularly suitable. Examples of suitable dicarboxylic acids containing radicals of formula I are polyethylene glycol, polypropylene glycol, polyethylenepropylene glycol and polytetrahydrofuran having the degree of polymerization stated and containing terminal carboxyl groups.

A preferred diamine has formula III below $$H_2N-R^5-NH_2 \qquad \text{III,}$$

in which $R^5$ denotes alkylene of from 4 to 16 carbon atoms or 1,3- or 1,4-phenylene or a radical of formula I in which $R^1$, $R^2$ and $R^3$ and n have the meanings stated. We particularly prefer a diamine of formula III in which $R^5$ is alkylene of from 4 to 8 carbon atoms or a radical of formula I in which the variables have the preferred meanings stated for $R^4$. Examples of suitable diamines are tetramethylene diamine, hexamethylene diamine, octamethylene diamine or ethylene-bis(3-aminopropyl) ether, 1,3-propylene-bis(2-aminoethyl) ether and polyethylene glycol, polypropylene glycol and polytetrahydrofuran having the degree of polymerization n stated and containing terminal amino groups.

The aqueous solution may also contain a lactam, preferably a lactam of from 6 to 12 carbon atoms, especially caprolactam, or the ω-aminoalkanoic acid corresponding to said lactam and having from 6 to 12 carbon atoms, in particular ω-aminocaproic acid. The amount of caprolactam added may be, for example, up to 90% w/w of the polyamide-forming compounds.

According to the invention, from 1 to 80%, and in particular from 5 to 60%, of the polyamide-forming units, based on the total polyamide-forming units (diamine, dicarboxylic acid and lactam or aminocarboxylic acid) comprise diamine and/or dicarboxylic acid units having, after removal of the amino or carboxyl groups, radicals of formula I and in particular of formula II or III in which $R^4$ or $R^5$ is a radical of formula I.

Obviously the composition of the polyamides formed corresponds to the composition of the starting materials used. The aqueous solution of the starting materials is conveniently obtained by reacting equimolar amounts of the said diamine and dicarboxylic acid with or without the addition of a lactam such as caprolactam. Advantageously, this solution has a pH of from 7.5 to 8.0 at 20° C. It is advantageous to start from a 40–70%, and in particular a 50–65% w/w aqueous solution having a temperature of from 80° to 100° C.

In stage a), an aqueous solution of the starting materials is passed through a tubular precondensation zone equipped with baffles, the residence time of the solution being from 1 to 10 minutes. In the first third of the tubular precondensation zone, the solution is heated to a temperature of from 250° to 290° C. under a pressure of from 1 to 10 bar with evaporation of water to give a mixture substantially consisting of a vapor phase and molten prepolymer. In the following two-thirds of the precondensation zone, there is intimate contact between the vapor phase and the molten prepolymer. The conditions of temperature and pressure are kept the same as in the first third of this zone. Advantageously, the residence time in the precondensation zone is from 60 to 180 seconds. It has also proved advantageous to maintain a conversion rate of at least 94%.

The precondensation zone is advantageously in the form of a bundle of tubes equipped with baffles to provide a large surface area. This is achieved, for example, by filling the tubes with packing elements such as Raschig rings, metal rings or, in particular, wire netting elements. The contact surface area is advantageously from 0.7 to 1.5 m² per liter of reactor volume.

The mixture of prepolymer and vapor is separated in a separation zone b) into molten prepolymer and a vapor phase, the pressure and temperature conditions being conveniently the same as in stage a). This separation normally occurs automatically on account of physical differences and is conducted in a vessel of which the bottom portion is in the form of a condensation zone. The vapor phase thus set free substantially comprises steam and diamine entrained by the evaporating water, and possibly small amounts of lactam if used.

The resulting prepolymer, which consists of low molecular weight polyamide and residual amounts of unconverted starting material depending on the degree of conversion achieved, and which usually has a relative viscosity of from 1.20 to 1.32, is passed into a condensation zone c). The melt is polycondensed in this condensation zone at a temperature of from 250° C. to 290° C. and under a pressure of from 1 to 10 bar. The vapors set free in this zone are advantageously separated off together with the aforementioned vapor phase. The residence time in the polycondensation zone is from 5 to 30 minutes and in particular from 7 to 20 minutes.

The polymer obtained in stage c) is passed as a melt through a discharge zone d) preferably with continual surface re-formation accompanied by removal of the water contained in the melt. A suitable discharge zone is, for example, a degassing extruder. The residence time in the discharge zone is advantageously not more than 2 minutes, e.g. 40 to 90 seconds. The temperature in the discharge zone is preferably from 260° to 280° C. The resulting polymer usually has a relative viscosity of from 1.39 to 1.53, as measured on a 0.5% solution in a 1:1 mixture of o-dichlorobenzene and phenol. The resulting anhydrous melt is extruded and granulated.

In stage e), the polymer is condensed in solid phase, e.g. in granular form, to the desired viscosity by heating at a temperature below the melting point of the polymer, e.g. from 160° to 190° C., under a blanket of an inert gas such as nitrogen or steam, in particular superheated steam, preferably flowing counter-currently. The steam used is advantageously that coming from the top of the column used in stage f).

In stage f), the vapor phase coming from the separation zone b) is separated into steam and aqueous diamine solution and the latter is recycled to stage a). The vapor phase is advantageously separated in a rectifying column. Examples of suitable columns are packed columns, bubble-tray columns and sieve-tray columns having from 5 to 15 theoretical trays. The pressure in the column is advantageously the same as in the precondensation zone. Advantageously, from 0.15 to 0.3 liter of water is introduced at the top of the column per kg of steam to improve separating efficiency. The bottoms comprise an aqueous solution of volatile diamine, which is recycled to stage a), whilst the rectified steam at the top of the column is advantageously used for the solid condensation stage.

The process of the invention has proved to be particularly suitable for the continuous preparation of a polyamide having ether bridges in the polymer chain using the following starting materials:

A) From 5 to 100% w/w of a salt of a diamine of formula IV

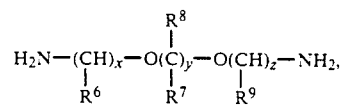

in which x, y and z are identical or different integers from 2 to 6 and $R^6$ to $R^9$ are the same or different and denote hydrogen or alkyl of from 1 to 3 carbon atoms, particularly hydrogen, and an equimolar amount of a dicarboxylic acid of formula II in which $R^4$ is alkyl of from 2 to 16 carbon atoms or 1,3- or 1,4-phenylene.

Particularly suitable are salts of a diamine of formula V below

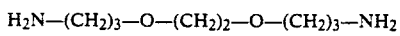

$$H_2N-(CH_2)_3-O-(CH_2)_2-O-(CH_2)_3-NH_2 \quad V$$

and adipic acid, terephthalic acid or isophthalic acid.

B) From 5 to 50% w/w of a salt of a dicarboxylic acid of formula II in which $R_4$ is alkylene of from 2 to 16 carbon atoms or 1,3- or 1,4-phenylene and an equimolar amount of a diamine of formula III in which $R_5$ is alkylene of from 4 to 16 carbon atoms. Particularly significant salts are those of hexamethylene diamine and adipic acid, terephthalic acid or isophthalic acid.

C) From 0 to 90% w/w of a lactam having from 6 to 12 carbon atoms in the ring, particularly caprolactam, or a corresponding ω-aminoalkanoic acid of from 6 to 12 carbon atoms, particularly ω-aminocaproic acid.

When preparing polyamides from the aforementioned starting materials it is advantageous to maintain a temperature of from 250° to 270° C. in stages a) to c) and from 260° to 270° C. in stage d).

Other preferred polyamides are copolyamides containing polyether segments. In this case use is made of the aforementioned starting materials in which from 2 to 80% of the polyamide-forming units, based on the total polyamide-forming units, are diamine or dicarboxylic acid units which, after removal of the amino or carboxyl groups, have radicals of formula I in which $R^1$, $R^2$ and $R^3$ are the same or different and denote alkylene of from 2 to 6 carbon atoms and n is an integer from 2 to 60. We prefer to use a dicarboxylic acid of formula II and a diamine of formula III. In preferred radicals of formula I, $R^1$ and $R^3$ denote alkylene of from 2 to 4 carbon atoms, in particular ethylene or propylene, and $R^2$ denotes alkylene of from 2 to 6 carbon atoms, in particular tetramethylene, and n is an integer from 5 to 20. In preferred copolymers, from 10 to 50% of the polyamide-forming units, based on the total polyamide-forming units, are diamine and/or dicarboxylic acid units which, after removal of the amino or carboxyl groups, have radicals of formula I. When preparing such copolymers it is advantageous to maintain a temperature of from 270° to 290° C. in stages a), b) and c).

The polyamide having ether bridges in the polymer chain and obtainable by the process of the invention is suitable for the manufacture of shaped articles by injection molding or extrusion, for example molded articles, filaments or fibers.

The process of the invention is illustrated by the following Examples.

EXAMPLES 1 TO 4

The diamine and dicarboxylic acid defined in Table 1 below are mixed in water in the form of pure monomers in virtually stoichiometric amounts. The stoichiometric ratio is checked against pH measurements. The resulting 50% w/w aqueous solution has a pH of 7.7. It is heated to 95° C. and passed down a vertical tube 3 meters long (vaporizing reactor) at a rate corresponding to a polyamide output of 5.0 kg/h. The tube is packed with Raschig rings and has a contact surface area of 2.0 m². In the uppermost third of the tube, which is heated at 255° to 260° C., the water of solution and most of the water of reaction is vaporized at a pressure of 5 bar. The conversion rate achieved in this zone is ≧94.0%. In the lower two-thirds of the tube, heated at the same temperature, intimate mass transfer occurs between partly vaporized volatile amine components (cf. Table 1), steam and progressively polycondensing prepolymer melt. The temperature of the reaction mixture is 256° C. The two-phase mixture leaving the precondensation zone is then separated into melt and vapors in a separator.

The degree of polymerization obtained is given in Table 1. The polymer melt remains in the separator, which also serves as polycondensation zone, for 15 minutes at 255°–260° C. and 5 bar, and is then continuously fed to a discharge screw having a vapor outlet zone, where it is degassed with release of pressure and extruded. The extrusion is solidified in a water bath and granulated. The temperature during degassing is 265° C. and the retention time in the degassing extruder is 1 minute. The resulting degree of polycondensation of the granular prepolymer is given in Table 1.

The amine-containing vapors are fed to a column in which the rectifying zone corresponds to 10 theoretical trays. Here the vapors are separated into the components listed in Table 1.

The entire polycondensation stream is kept under a pressure of 5 bar by pressurizing means applied downstream of the column. Water is sprayed in at the top of the column at a rate of about 1 liter/h in order to improve separating efficiency, the temperature measured at the top of the column being 152° C.

After rectification, the volatile amine component collects virtually quantitatively at the bottom of the column, from which it is continuously recycled via a metering pump to the vaporizing reactor, where it is mixed with the aqueous monomer solution.

The granular prepolymer is then post-condensed, in the solid phase, to the desired molecular weight using superheated steam from the column as heat transfer medium.

The conditions prevailing during post-condensation and the properties of the end products are listed in Table 1. In all of the Examples listed there are obtained colorless polymer granules showing a high degree of purity.

TABLE 1

| | Example No. | | | |
|---|---|---|---|---|
| | 1 | 2 | 3 | 4 |
| Composition (% by weight)[1] | A 100 | A 50 B 50 | A 25 B 75 | A 12.5 B 87.5 |
| Degree of polycondensation following vaporizing reactor | | | | |
| $\eta_{rel}^2$ | 1.20 | 1.32 | 1.28 | 1.30 |
| terminal groups: | | | | |
| mole equivalents/kg —COOH | 130 | 141 | 144 | 147 |
| mole equivalents/kg —NH$_2$ | 156 | 153 | 174 | 177 |
| Degree of polycondensation following separator (prepolymer granules) | | | | |
| $\eta_{rel}^2$ | 1.39 | 1.52 | 1.50 | 1.53 |
| terminal groups: | | | | |
| mole equivalents/kg —COOH | 90 | 103 | 104 | 107 |
| mole equivalents/kg —NH$_2$ | 116 | 116 | 134 | 124 |
| Amine component | | | | |
| vapors (%)[3] | 0.8 | 1.5 | 2.8 | 3.1 |
| bottoms (%)[3] | 6.1 | 12.0 | 17.0 | 21.0 |
| downstream of column (%)[3] | <0.001 | <0.001 | <0.001 | <0.001 |
| Solid phase condensation conditions | | | | |

TABLE 1-continued

|  | Example No. | | | |
| --- | --- | --- | --- | --- |
|  | 1 | 2 | 3 | 4 |
| temperature (°C.) | 160 | 165 | 165 | 165 |
| residence time (h) | 40 | 20 | 20 | 20 |
| Degree of polycondensation of end product | | | | |
| $\eta_{rel}^2$ | 1.62 | 1.75 | 1.78 | 1.82 |
| terminal groups: | | | | |
| mole equivalents/kg —COOH | 26 | 57 | 55 | 58 |
| mole equivalents/kg —NH$_2$ | 39 | 55 | 87 | 69 |
| melting point (DSC, °C.) | 172 | 188 | 241 | 249 |

[1]Component A - Salt of 4,7-dioxadecanediamine-1,12 and adipic acid
Component B - AH salt
[2]$\eta_{rel}$ measured on a 0.5% solution in a 1:1 o-dichlorobenzene/phenol mixture
[3]percentages based on polyamide

EXAMPLES 5 TO 7

A diamine and dicarboxylic acid or caprolactam, as defined in Table 2 below, are mixed in water in the form of pure monomers in virtually stoichiometric amounts. The stoichiometric ratio is checked against pH measurements. The resulting 50% w/w aqueous solution has a pH of 7.7. It is heated to 95° C. and passed down a vertical tube 3 meters long (vaporizing reactor) at a rate corresponding to a polyamide output of 5.0 kg/h. The tube is packed with Raschig rings and has a contact surface area of 2.0 m$^2$. In the uppermost third of the tube, which is heated at 281° to 285° C., the water of solution and most of the water of reaction is vaporized. In the lower two-thirds of the tube, heated at the same temperature, intimate mass transfer occurs between partly vaporized volatile amine components (cf. Table 2), steam and progressively polycondensing prepolymer melt. The temperature of the reaction mixture is 281° to 285° C. and the pressure is 5 bar. The two-phase mixture leaving the precondensation zone is then separated into melt and vapors in a separator.

The degree of polycondensation obtained is given in Table 2. The polymer melt remains in the separator, which also serves as polycondensation zone, for 15 minutes at 281°–285° C. and 5 bar, and is then continuously fed to a discharge screw having a vapor outlet zone, where it is degassed with release of pressure and extruded. The extrusion is solidified in a water bath and granulated. The temperature during degassing is 275° C. and the retention time in the degassing extruder is not more than 2 minutes. The degree of polycondensation of the granular prepolymer formed is given in Table 2.

The amine-containing vapors are fed to a column in which the rectifying zone corresponds to 10 theoretical trays. Here the vapors are separated into the components listed in Table 2. The entire polycondensation stream is kept under a pressure of 5 bar by pressurizing means applied downstream of the column. Water is sprayed in at the top of the column at a rate of about 1 liter/h in order to improve separating efficiency, the temperature measured at the top of the column being 152° C. After rectification, the volatile amine components collect virtually quantitatively at the bottom of the column in the form of an aqueous solution, which is continuously recycled via a metering pump to the polycondensation zone upstream of the vaporizing reactor, where it is mixed with the aqueous starting solution.

The granular prepolymer is then post-condensed, in the solid phase, to the desired molecular weight using superheated steam from the column as heat transfer medium.

The conditions prevailing during post-condensation and the properties of the end products are listed in Table 2. In all of the Examples listed there are obtained colorless polymer granules showing a high degree of purity.

TABLE 2

|  | Example No. | | |
| --- | --- | --- | --- |
|  | 5 | 6 | 7 |
| Composition (% by weight)[1] | A 30 | A 30 | A 50 |
|  | B 70 | — | B 50 |
|  | — | C 70 | — |
| Degree of polycondensation following vaporizing reactor | | | |
| $\eta_{rel}^2$ | 1.29 | 1.22 | 1.23 |
| terminal groups: | | | |
| mole equivalents/kg —COOH | 131 | 134 | 116 |
| mole equivalents/kg —NH$_2$ | 138 | 147 | 162 |
| Degree of polycondensation following separator | | | |
| $\eta_{rel}^2$ | 1.52 | 1.41 | 1.39 |
| terminal groups: | | | |
| mole equivalents/kg —COOH | 99 | 102 | 81 |
| mole equivalents/kg —NH$_2$ | 109 | 115 | 129 |
| Volatile components | HMD | caprolactam | HMD |
| vapors (%)[3] | 2.1 | 3.4 | 1.8 |
| bottoms (%)[3] | 17 | 25 | 12 |
| downstream of column (%)[3] | <0.05 | <0.001 | <0.001 |
| Solid phase condensation conditions | | | |
| temperature (°C.) | 190 | 190 | 190 |
| residence time (h) | 20 | 24 | 24 |
| Degree of polycondensation of end product | | | |
| $\eta_{rel}^2$ | 2.34 | 1.94 | 1.73 |
| terminal groups: | | | |
| mole equivalents/kg —COOH | 51 | 38 | 30 |
| mole equivalents/kg —NH$_2$ | 46 | 36 | 54 |

[1]Component A - Salt of bis-aminopropyl-polytetrahydrofuran 750 and adipic acid in the form of a concentrated aqueous solution (percentages based on the solids content)
Component B - AH salt
Component C - Caprolactam
[2]$\eta_{rel}$ measured on a 0.5% solution in a 1:1 o-dichloro-benzene/phenol mixture
[3]percentages based on polymer

We claim:
1. A process for the continuous preparation of a linear polyamide having ether bridges in the polymer chain, in which
a) an aqueous solution of a salt of a diamine and an equimolar amount of a dicarboxylic acid, with or without a lactam or the corresponding amino-carboxylic acid, from 1 to 80% of the polyamide-forming units, based on the total polyamide-forming units, being selected from the group consisting of diamine units, dicarboxylic acid units or mixtures thereof which, after removal of the amine groups of carboxyl groups, having radicals of formula I

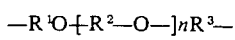

in which R$^1$, R$^2$ and R$^3$ are the same or different and denote unsubstituted alkylene radicals of from 2 to 6 carbon atoms, or alkylene units containing alkyl radicals of from 1 to 3 carbon atoms as substituents, and n is an integer from 1 to 60, is passed through a tubular precondensation zone equipped with baffles over a period of from 1 to 10 minutes and is heated over the first third of said zone to a temperature of from 250° to 290° C. under a pressure of from 1 to 10 bar, with evaporation of water, to give a mixture substantially comprising a vapor phase and molten prepolymer, which vapor phase and prepolymer are brought into intimate contact with each other over the subsequent two-thirds of said precondensation zone, b) the molten prepolymer is separated from the vapor phase in a separation zone, c) the prepolymer s condensed in a condensation zone under a pressure of from 1 to 10 bar and at a temperature of from 250° C. to 290° C. during a residence time of from 5 to 30 minutes, d) the polymer is removed from the condensation zone through a discharge zone with removal of the residual water to give a polymer capable of being granulated, e) which polymer is further condensed in the solid phase to the desired viscosity, under a blanket of inert gas at elevated temperature, f) the vapor phase obtained in stage b) is separated, in a column, into steam and an aqueous solution containing diamine and the said aqueous solution is recycled to stage a).

2. A process as defined in claim 1, wherein the residence time in stage a) is from 60 to 180 seconds.

3. A process as defined in claim 1, wherein the residence time in stage c) is from 7 to 20 minutes.

4. A process as defined in claim 1, wherein distillation of the vapor phase in stage f) is carried out under the pressure of stage a).

5. A process as defined in claim 1, wherein the solid polymer is further condensed in stage e) with the steam obtained in stage f).

6. A process as defined in claim 1, wherein the salt is a salt of a dicarboxylic acid of formula II $$HOOC-R^4-COOH \qquad II,$$

in which $R^4$ denotes an alkylene radical of from 2 to 16 carbon atoms or a 1,3- or 1,4-phenylene radical or a radical of formula I, and an equimolar amount of a diamine of formula III $$H_2N-R^5-NH_2 \qquad III,$$

in which $R^5$ denotes an alkylene radical of from 4 to 16 carbon atoms or a 1,3- or 1,4-phenylene radical or a radical of formula I, with or without additional lactam of from 6 to 12 carbon atoms or the corresponding ω-aminocarboxylic acid, from 2 to 80% of the polyamide-forming units, based on the total polyamide-forming units, being diamine units dicarboxylic acid units or mixtures thereof having radicals of formula I.

* * * * *

UNITED STATES PATENT AND TRADEMARK OFFICE
CERTIFICATE OF CORRECTION

PATENT NO. : 5,051,491

DATED : September 24, 1991

INVENTOR(S) : Gunter PIPPER et al.

It is certified that error appears in the above-identified patent and that said Letters Patent is hereby corrected as shown below:

<u>Claim 1, Column 9, Line 6</u>:

That part reading "prepolymer s condensed" should read --prepolymer is condensed--

Signed and Sealed this

Nineteenth Day of January, 1993

Attest:

DOUGLAS B. COMER

*Attesting Officer*    Acting Commissioner of Patents and Trademarks